United States Patent [19]

Maile

[11] Patent Number: 4,590,546
[45] Date of Patent: May 20, 1986

[54] VARIABLE INPUT VOLTAGE REGULATOR CIRCUIT

[75] Inventor: Donald W. Maile, Lancaster, Pa.

[73] Assignee: RCA Corporation, Princeton, N.J.

[21] Appl. No.: 582,685

[22] Filed: Feb. 23, 1984

[51] Int. Cl.[4] .............................................. H02M 7/19
[52] U.S. Cl. ....................................... 363/37; 323/299
[58] Field of Search ................... 307/64, 80; 323/299, 323/300; 363/143, 37, 142

[56] References Cited

U.S. PATENT DOCUMENTS

| | | | |
|---|---|---|---|
| 3,815,009 | 6/1974 | Berger | 363/142 |
| 3,900,787 | 8/1975 | Köster | 363/143 |
| 4,001,668 | 1/1977 | Lewis | 323/299 |
| 4,028,606 | 6/1977 | Beuchée et al. | 321/2 |
| 4,129,791 | 12/1978 | Sato | 323/299 |
| 4,331,978 | 5/1982 | Nowaczyk | 358/190 |
| 4,432,034 | 2/1984 | Wohlert et al. | 361/154 |

FOREIGN PATENT DOCUMENTS

| | | |
|---|---|---|
| 1110863 | 4/1968 | United Kingdom . |
| 1299560 | 12/1972 | United Kingdom . |
| 1411569 | 10/1975 | United Kingdom . |
| 1460756 | 1/1977 | United Kingdom . |
| 1476699 | 6/1977 | United Kingdom . |
| 1505289 | 3/1978 | United Kingdom . |
| 2125194 | 2/1984 | United Kingdom . |
| 2144931 | 3/1985 | United Kingdom . |

*Primary Examiner*—Patrick R. Salce
*Assistant Examiner*—D. L. Rebsch
*Attorney, Agent, or Firm*—Paul J. Rasmussen; Joseph Laks; Scott J. Stevens

[57] ABSTRACT

A power supply provides a regulated DC voltage level for a wide range of AC supply levels. The power supply incorporates circuitry which forms a voltage doubler or a full wave rectifier in response to the level of the AC supply voltage. The transition between the type of rectification is rapid, so that the regulated voltage remains constant.

3 Claims, 1 Drawing Figure

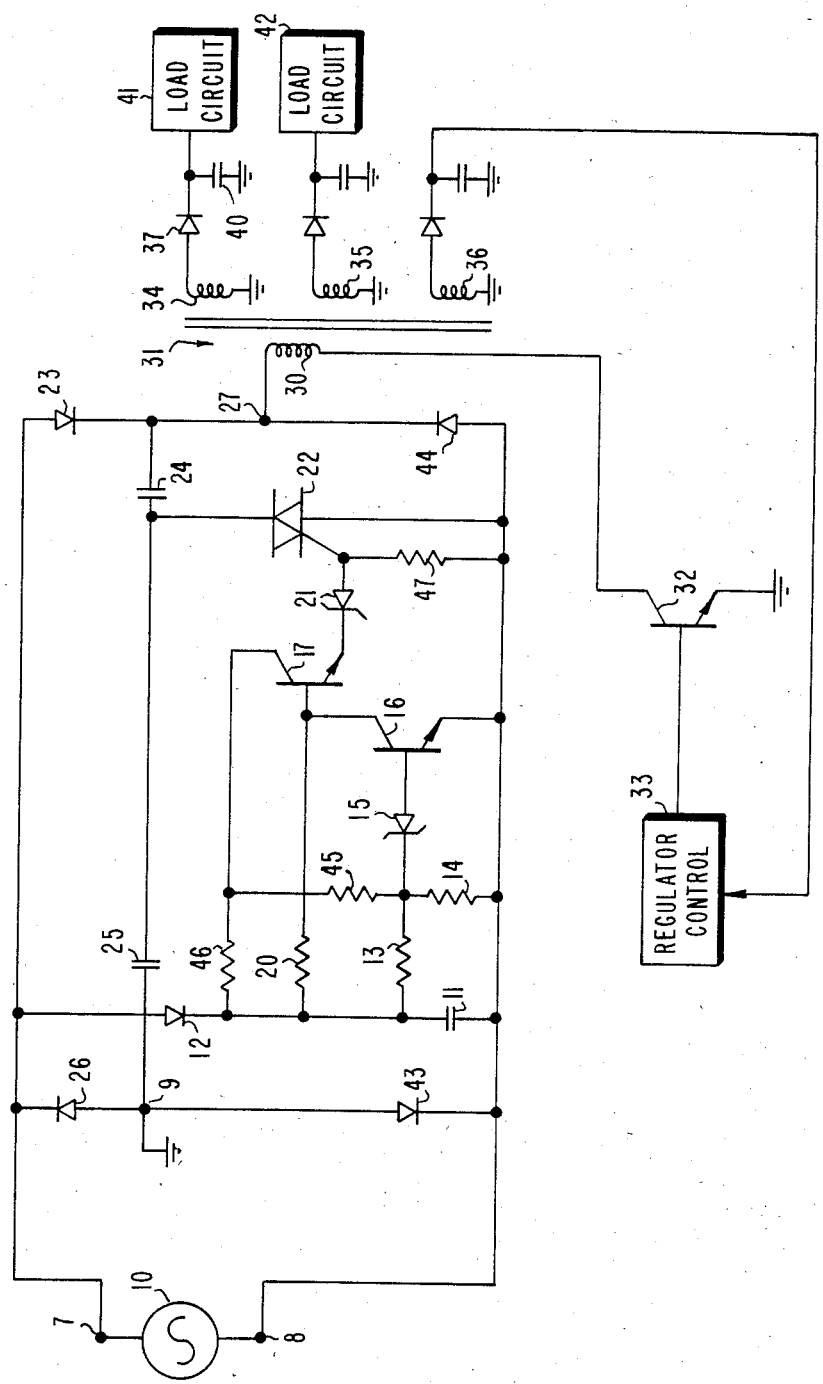

VARIABLE INPUT VOLTAGE REGULATOR CIRCUIT

This invention relates to power supply voltage regulators and, in particular, to regulator circuits that produce a constant output voltage independent on large variations in input voltage.

Computer monitors are often manufactured to be compatible with as many different computer systems as possible in order to increase the market for monitor sales. This may require that the monitor operate at a variety of input voltages. It is important that the power supply voltage regulator of the monitor be capable of providing constant output voltages regardless of the level of the input voltage. This is important in order to protect monitor circuit components, which may exhibit decreased performance or reliability if operated at voltage levels outside specified ranges. Variation in regulated voltage levels may also result in undesirable video distortion, which is a particular problem with monitor operation where textual displays require good resolution and low distortion for optimum readability.

It is also desirable that the power supply automatically compensate for whatever input voltage level is provided in order to simplify user requirements for different monitor applications.

The present invention is directed to a regulated power supply, appropriate for use in a video display apparatus such as a computer monitor, that provides a constant regulated output voltage over a wide range of input voltage levels.

In accordance with the present invention, a power supply comprises an unregulated AC voltage source and circuitry for providing a voltage level representative of the amplitude of the unregulated AC voltage. Circuitry responsive to the representative voltage level produces an output signal when the representative signal is above a predetermined level. A first rectifying means is provided for producing a DC voltage. A circuit forms a second rectifying means when coupled to the first rectifying means. A switch is responsive to the output signal for coupling the circuit to the first rectifying means. A regulator circuit is responsive to the DC voltage produced by the first or second rectifying means for providing a regulated DC voltage level that is substantially constant regardless of the amplitude of the unregulated AC voltage.

In the accompanying drawing, the sole FIGURE is a schematic and block diagram of a power supply in accordance with an aspect of the present invention.

Referring to the FIGURE, an AC voltage supply 10 provides an rms voltage amplitude which, for most applications, is of the order of 110 volts or 220 volts, but may be continuously selectable through a range of the order of 90 volts to 250 volts.

The AC input voltage from supply 10 will cause capacitor 11 to charge through diode 12. Resistors 13 and 14 form a voltage divider which applies the voltage across capacitor 11 to the cathode of a zener diode 15, which is selected to have a breakdown voltage of approximately 20 volts. For an AC supply voltage of the order of 110 volts rms, resistors 13 and 14 will apply approximately 17 volts to zener diode 15, which is insufficient to cause zener diode 15 to conduct. Transistor 16 will therefore be nonconductive.

With transistor 16 turned off, transistor 17 will be rendered conductive and will receive base current from the AC line through diode 12 and a resistor 20. Conduction current of transistor 17 causes a zener diode 21 to conduct, such that a switching device, illustratively shown as a triac 22, is turned on. Conduction of triac 22 causes the power supply of the FIGURE to operate as a half wave voltage doubler. During the portion of the AC line voltage waveform in which the voltage at terminal 7 is positive with respect to terminal 8, current will flow from the AC supply 10 through a diode 23, a capacitor 24, and triac 22 back to supply 10. Capacitor 24 will charge to a level of approximately 1.4 times the amplitude of the AC supply. If the supply is of the order of 110 volts rms, capacitor 24 will charge to approximately 155 volts.

During the portion of the AC line voltage waveform in which the voltage at terminal 7 is negative with respect to terminal 8, current will flow from supply 10 through triac 22, capacitor 25 and diode 26 back to the supply 10. Capacitor 25 will also charge to approximately 1.4 times the AC supply amplitude. The voltage across capacitors 24 and 25 will be series aiding, such that the voltage at output terminal 27 relative to a circuit ground point 9 will be of the order of 2(1.4×AC rms supply amplitude). For an AC voltage supply of 110 volts rms, the voltage at output terminal 27 will be approximately +308 volts.

The voltage at terminal 27 is applied to one terminal of a primary winding 30 of a power transformer 31. The other terminal of winding 30 is coupled to the collector of a regulator transistor 32. Conduction of regulator transistor 32 is controlled by a pulse width modulated signal from regulator control circuitry 33, which may incorporate, for example, an integrated circuit identified as AN5900, manufactured by Matsushita Electric Corporation.

Conduction of regulator transistor 32 energizes winding 30 which, by transformer action, energizes secondary windings 34, 35 and 36. The voltage developed across secondary winding 34 is rectified by diode 37 and filtered by capacitor 40 to produce a direct voltage that powers load circuit 41. In a similar manner, the voltage developed across winding 35 is rectified and filtered to power load circuit 42. The rectified and filtered voltage from secondary winding 36 is applied to regulator control circuit 33 which controls the conduction time of transistor 32, in order to regulate the voltages applied to load circuits 41 and 42. Transformer 31 may, of course, include additional secondary windings for providing other regulated voltage levels for other load circuits.

For an AC supply level of the order of 220 volts rms, capacitor 11 will charge via diode 12 to a level sufficient to cause zener diode 15 to conduct. Conduction of zener diode 15 causes transistor 16 to conduct which removes base current from transistor 17, thereby turning transistor 17 off. Zener diode 21 will not conduct, and triac 22 will then be turned off, resulting in the power supply of the FIGURE operating as a full wave bridge rectifier.

During the portion of the AC supply voltage waveform in which terminal 7 is positive with respect to terminal 8, current will flow from supply 10 through diode 23, capacitor 24 and 25, and a diode 43 back to supply 10. During the portion of the AC supply voltage waveform in which terminal 7 is negative with respect to terminal 8, current will flow from supply 10 through a diode 44, capacitors 24 and 25 and diode 26, back to supply 10. Capacitors 24 and 25 will charge in series to a level approximately 1.4 times the supply voltage which, for a supply level of 220 volts rms, will be approximately 308 volts.

It can be seen that the voltage at output terminal 27 will be the same for rms supply voltages of 110 volts and 220 volts. For voltage levels other than those previously described, regulator control circuit 33 will control the conduction of transistor 32 so that the desired load circuit voltage regulation occurs for AC supply voltage levels of the order of 90 volts to 250 volts.

As the supply voltage increases during startup, for example, or in the case of a poorly regulated AC supply, the voltage across capacitor 11 increases so that the voltage applied to the cathode of zener diode 15 increases. As the breakdown voltage of zener diode 15 is reached, current begins to flow in transistor 16. This conduction begins to remove base current from transistor 17. Since transistor 17 is in saturation, it does not turn off immediately. As transistor 17 comes out of saturation, the voltage level at its collector increases, causing current to flow through resistor 45 into the base of transistor 16, increasing its conduction. The feedback through resistor 45 causes transistor 17 to turn off quickly, so that triac 22 will switch on and off in a "snap action" fashion at a particular AC supply voltage which, for the circuit shown, is illustratively of the order of 140 volts rms. This causes a rapid transition between the rectifiers; i.e., doubler and full wave bridge, when, for example, the AC voltage level increases during startup or under poorly regulated AC supply conditions. The change in type of rectification will greatly reduce the voltage range over which the regulator is forced to operate. The rapid transition reduces any transient effects so that the regulated DC voltage remains constant. Resistor 45 also provides some hysteresis, illustratively of the order of 5 volts, to the level at which the supply voltage switches as the supply voltage increases or decreases about the switching voltage level. Resistor 46 limits the gate current supplied to triac 22 and also limits the power dissipation of transistor 17. Resistor 47 stabilizes the switching of triac 22.

The previously described power supply therefore will operate automatically as a voltage doubler or a bridge rectifier solely in response to the AC supply voltage level. A pulse width regulator is effective within the output voltage range produced by the voltage doubler or bridge rectifier in order to maintain fixed regulated output voltages independent of the AC supply voltage level.

Representative component values are as follows.
Zener diode 15: 20 volts
Zener diode 21: 20 volts
Resistor 13: 150 KΩ
Resistor 14: 18 KΩ
Resistor 20: 390 KΩ
Resistor 45: 3.3 MΩ
Resistor 46: 39 KΩ
Resistor 47: 18 KΩ
Capacitor 11: 4.7 μF
Capacitor 24: 220 μF
Capacitor 25: 220 μF

What is claimed is:

1. A power supply comprising:
    a source of unregulated AC voltage having an amplitude between a first and a second level;
    means for providing a voltage level representative of the amplitude of said unregulated AC voltage;
    means responsive to said representative voltage level for producing an output signal when said representative voltage level is above a predetermined level corresponding to an unregulated AC voltage amplitude intermediate said first and second levels;
    first rectifying means coupled to said unregulated AC voltage source for producing a first DC voltage from said AC voltage;
    circuit means for forming a second rectifying means for producing a second DC voltage from said AC voltage when said circuit means is coupled to said first rectifying means;
    switch means responsive to said output signal for coupling said circuit means to said first rectifying means when said unregulated AC voltage level is above said intermediate level comprising:
    a bidirectional switch coupled to said first rectifying means and to said circuit means;
    a first transistor coupled to said output signal producing means; and
    a second transistor, regeneratively coupled to said first transistor and to said bidirectional switch, said first and second transistors cooperating to provide rapid switching of said bidirectional switch; and
    regulator means responsive to said first or second DC voltage for providing a DC output voltage having a fixed regulated level with respect to variations in the level of said unregulated AC voltage between said first and second levels.

2. The arrangement defined in claim 1, wherein said first rectifying means comprises a half-wave bridge rectifier.

3. The arrangement defined in claim 2, wherein said circuit means comprises a switchable current path for modifying said half-wave bridge rectifier to form a full-wave bridge rectifier.

4. The arrangement defined in claim 1, wherein said switch means comprises a triac.

5. The arrangement defined in claim 1, wherein said output signal producing means incorporates means for producing hysteresis for determining the level of said representative voltage level at which said output signal producing means produces said output signal when said representative voltage level varies above and below said predetermined level.

* * * * *